Jan. 29, 1946.  E. C. STEINER  2,393,834
ENGINE LUBRICATION SYSTEM
Filed April 24, 1943
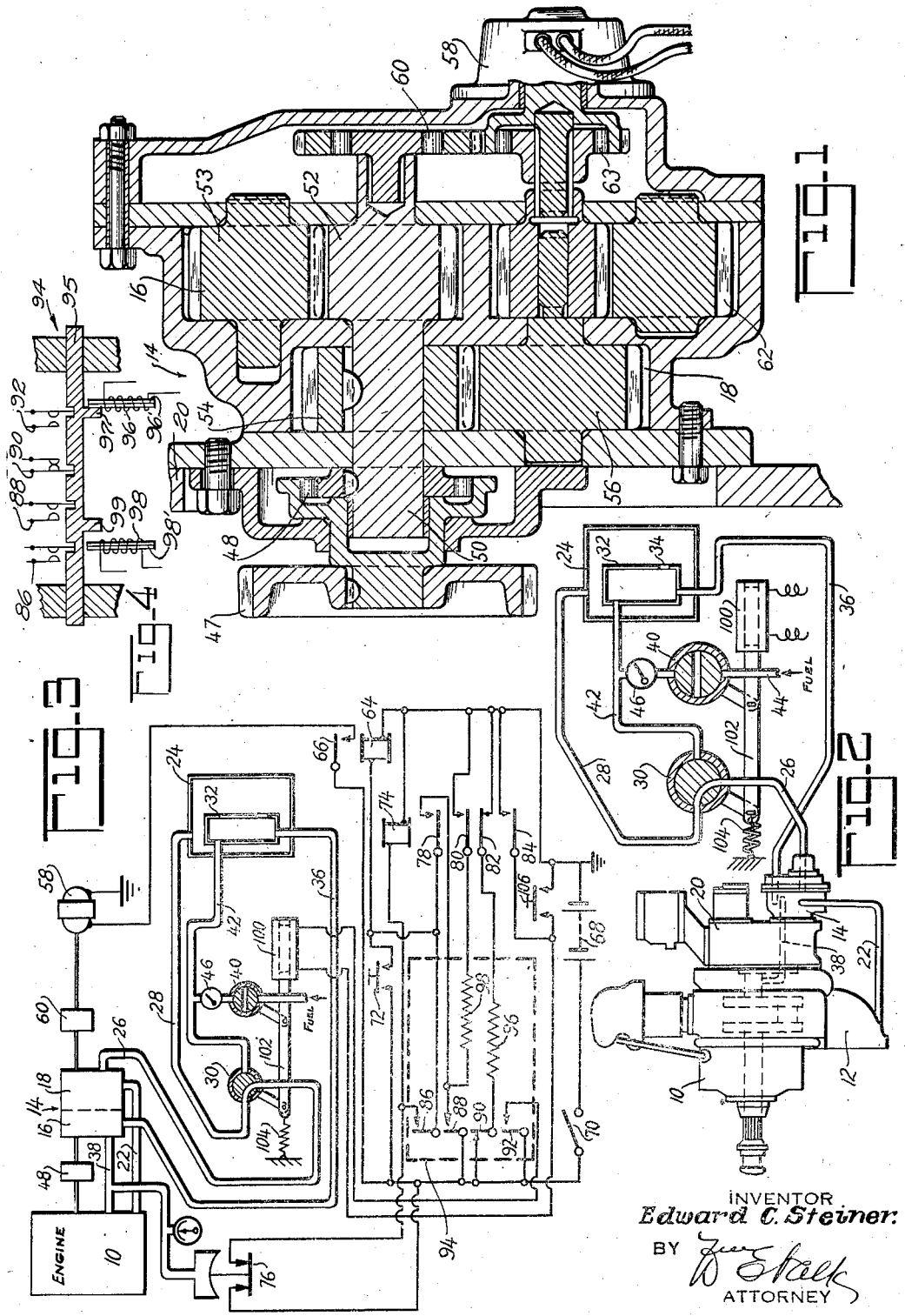
INVENTOR
Edward C. Steiner:
BY
ATTORNEY Patented Jan. 29, 1946

2,393,834

UNITED STATES PATENT OFFICE 2,393,834

ENGINE LUBRICATION SYSTEM

Edward C. Steiner, Oklahoma City, Okla., assignor to Wright Aeronautical Corporation, a corporation of New York Application April 24, 1943, Serial No. 484,461

6 Claims. (Cl. 123—196)

This invention relates to pressure feed lubrication systems for use in aircraft engines and is a continuation in part of my co-pending application, Serial No. 426,668, filed January 14, 1942.

The co-pending application discloses an engine lubrication system and control means therefor in which an engine driven oil pressure pump may be driven as by an auxiliary motor prior to starting the engine in order that all bearing surfaces of the engine will be flood lubricated at the instant of starting. In addition, the co-pending application discloses an automatic control for operating the oil pressure and scavenging pumps for a predetermined length of time after the engine has stopped in order to scavenge excess oil from the engine. This latter feature is particularly applicable to aircraft engines which utilize a conventional "dry sump" lubrication system. During operation of the engine, a considerable amount of the total oil supply is whirled around inside the engine whereby when the engine stops this oil settles down into the engine sump. This after-running of the scavenging pump serves to remove this surplus oil from the engine and prevents the oil level from rising to a point where it can flow into the lower cylinders of a radial cylinder engine. Such oil flow into the lower cylinders may result in damage to the engine parts upon starting the engine because of the resulting quantity of oil in the lower cylinder heads.

Just prior to stopping an aircraft engine, it is conventional practice to divert the return oil from the main oil supply tank into a so-called warm-up hopper within the oil supply tank. It is also customary to dilute this diverted oil with gasoline, whereby this diluted oil is fed into the lubrication system to wash the heavier oil from the various bearing surfaces. When the engine is started, this diluted oil is fed into the lubrication system thereby facilitating the starting operation. However, if the oil pressure and scavenging pumps are operated after the engine has stopped, as taught in my above cited co-pending application, then the effect of this previous diversion and dilution of the oil would be nullified. Accordingly, it is an object of this invention to provide means to only circulate the diluted oil during the after-running of the engine oil pressure and oil scavenging pumps. Specifically, this invention provides for operation of the diversion valve during the after-running operation, thereby providing for circulation of only the diluted oil. Furthermore, it is not desirable or practical to rely on manual control on the part of the pilot or operator for insuring continued diversion of the scavenged oil during the automatic after-running operation. Therefore, it is a further object of this invention to modify the control for a lubrication system which embodies scavenging a lubrication system which embodies scavenging the system after the engine has stopped so that automatic means are provided to insure continued diversion of the scavenged oil during the after-running operation.

Other objects of this invention will become apparent in reading the annexed detailed description in connection with the drawing, in which:

Fig. 1 is a longitudinal sectional view through the oil pump unit;

Fig. 2 is a side elevation of an aircraft engine and oil tank assembly embodying the invention;

Fig. 3 is a diagrammatic view of the lubrication system; and

Fig. 4 is a detailed view of a switch relay incorporated in the system.

The conventional radial cylinder aircraft engine is illustrated at 10. This engine is provided with a so-called "dry sump" lubrication system having an oil sump 12 into which surplus oil drains from within the engine. An engine driven oil pump unit 14 containing a pressure pump 16 and a scavenging pump 18 is secured to the rear accessory section 20 of the engine. The scavenging pump removes the oil from the engine sump through a line 22 and delivers this oil to the oil supply tank 24 through lines 26 and 28 and diversion valve 30. Within the tank 24 a so-called warm-up hopper 32 is provided, which hopper has one or more openings 34 interconnecting the lower end of the hopper with the main tank. From the bottom of the hopper oil is fed through a pipe 36 to the intake side of the pressure pump 16 within the pump unit 14, and this pump delivers the oil through passages such as 38 to various parts of the engine. This lubrication system is diagrammatically illustrated in Fig. 3.

In order to facilitate starting the engine, it is conventional practice to dilute a portion of the engine oil with fuel (gasoline) for a few minutes before stopping the engine, thereby washing the undiluted heavier oil from the various bearing surfaces. Simultaneously with this dilution, the oil returned by the scavenging pump is diverted directly into the warm-up hopper so that this hopper becomes filled with diluted oil. Accordingly, when the engine is again started, after being shut down, the engine will be initially lubricated by this diluted oil thereby greatly facilitating the starting operation.

The oil dilution system comprises a diversion valve 30 in the return line 26, 28 and the scavenging pump, and a dilution valve 40. In the normal position of the diversion valve, as illustrated in Figs. 2 and 3, the scavenging pump returns the oil through line 23, diversion valve 30, and line 28 to the top of the tank 24. From the tank 24 the oil flows through openings 34 into the lower end of the hopper and thence into line 36 to the pressure pump 16. A few minutes before the engine is to be stopped, this diversion valve 30 is operated to divert the return oil directly to the top of the hopper through a line 42, and simultaneously the dilution valve 40 is operated to permit fuel to be introduced into the oil line 42 from fuel conduit 44. This operation results in the circulation of diluted oil through the engine, and since the diversion valve returns this oil directly to the warm-up hopper, the hopper becomes filled with diluted oil before the engine is stopped. Therefore, when the engine is started, the engine initially will be lubricated by diluted oil. A check valve 46 is provided between the dilution valve 42 and oil line 40 for the reason hereinafter explained.

The oil pressure and scavenging pumps 16 and 18 respectively of pump unit 14 are driven from the engine through gear 47 and a one-way clutch 48 drivably connected to a shaft 50. The oil pressure pump 16 comprises a gear 52 on the shaft 50 and an idler gear 53, while the scavenging pump comprises a drive gear 54 keyed to the shaft 50 and an idler gear 56. An electric motor 58 provides an independent drive for these pumps through a one-way clutch 60 of opposite hand from the one-way clutch 48 and drivably connected to shaft 50. When the engine is driving the pumps, clutch 60 overruns, while when the engine is shut down and the motor 58 is driving the pumps, the clutch 48 overruns. Accordingly, the electric motor 58 may be operated to pre-oil the engine before starting and to scavenge the lubrication system after the engine has stopped. The pump unit 14 also includes an auxiliary pump 62 drivably connected to the electric motor 58 through a one-way clutch 63. This clutch is of such hand that when the electric motor 58 is reversed in a direction from that normally required to drive pumps 16 and 18, it will drive the auxiliary pump 62. During normal operation of the engine the electric motor 58 for driving pumps 16 and 18 is not needed. Accordingly, the motor 58 may be reversed to drive the auxiliary pump 62 to supply oil pressure to various engine or aircraft accessories. For a more detailed description of the pump unit 14, reference is made to my above cited co-pending application.

As illustrated in Fig. 3, a motor relay 64 is provided with a switch 66 for controlling the circuit of the electric motor 58 from a battery 68 or other source of electric energy. After the master switch 70 has been closed, a push button switch 72, under the control of the operator, controls the operation of the motor relay 64 for energizing the motor 58 whereby the operator may pre-oil the engine before it is started. Simultaneously with the closing of the master switch 70 a circuit is completed for the control relay 74 through a switch 76 responsive to the oil pressure delivered by the pump 16. Operation of the control relay 74 reverses its switches 78, 80, 82, and 84 from that illustrated in Fig. 3. However, in view of the condition of these switches and of the connected switches 86, 88, 90 and 92 of the timing relay 94, such energization of the control relay 74 has no operative effect. As diagrammatically illustrated in Fig. 3, the elements of the timing relay 94 are enclosed by a dashed line.

The relay 94 is illustrated in Fig. 4 and comprises a movable switch operating member 95 to which the movable members of switches 86, 88, 90 and 92 are connected. The operating member 95 is provided with projections 97 and 99 engageable by bimetallic members 96' and 98', which in turn are controlled by heater elements 96 and 98, respectively. With this arrangement, after the heater element 96 is energized for a predetermined length of time, the resulting expansion of the bimetallic element 96' is operative to bend this element against the projection 97 to move the switch operating member 95 to the left, thereby reversing the position of the switches 86, 88, 90 and 92 from that illustrated. As hereinafter described this reversal of the switches de-energizes the heater element 96, and thereupon the bimetallic element 96' will cool and contract and return to its original condition without disturbing the switches. Then if heater element 98 is energized, bimetallic element 98' will operate after a predetermined length of time to return the switch operating member 95 to the right, thereby restoring the switches to their original condition. Suitable stops may be provided to limit the range of motion of the switch operating member 95. The above described structural details of the relay 94 form no part of the present invention.

After the engine has started, the oil pressure builds up and opens the oil pressure switch 76 thereby opening the circuit of the control relay 74. This de-energization of the control relay 74 closes a circuit for the timing relay heater element 96 through control relay switch 82 and timing relay switch 90. Upon energization of the heater element 96 for a predetermined period, for example 10 to 12 minutes, the timing relay member 96', expansible in response to the heat emitted by element 96, is operative to reverse the condition of the timing relay switches 86, 88, 90 and 92 from that illustrated, thereby opening the circuit of the heater element 96 at switch 90. As explained in connection with Fig. 4, de-energization of the heater element 96 and the resulting contraction of bimetallic element 96' does not affect the position of the switches of relay 94. When the engine is shut down, pressure switch 76 again closes so that the control relay 74 is again energized. Then because of the previous operation of the timing relay switches (10 to 12 minutes after the engine has started), energization of control relay 74 closes a circuit to the motor relay 64 through switches 88 and 78. In addition, this operation of the control relay 74 closes a holding circuit for itself independent of the pressure switch 76 through switches 88, 78 and 86. Accordingly, the motor 58 is energized to operate the oil pressure and scavenging pumps 16 and 18 respectively, to automatically scavenge the engine after the engine has stopped. The scavenging pump 18 has a larger capacity than the oil pressure pump 16 so that the operation of these pumps will scavenge the engine sump even though the oil pressure pump is also operated.

Simultaneously with the above energization of the motor relay 64, when the engine is stopped a circuit is also completed through the heater element 98 of the timing relay through switches 88 and 80. After the heater element 98 has been energized for a predetermined length of time, for example one minute, the timing relay member 98', expansible in response to the heat emitted by element 98, is operative to restore the timing relay switches to their normal condition, as illustrated in Fig. 3. This operation of the timing relay breaks the circuits to the relay 64 and heater element 98 whereupon bimetallic element 98' contracts to its original condition. Thus, the heater element 98 determines the length of time of the after-running operation. The above described operation of the electric motor control for the pump unit forms no part of the present invention and functionally substantially corresponds to that disclosed in my previously cited co-pending application.

As previously mentioned, means are provided for operating the diversion and dilution valves 30 and 40 respectively just prior to stopping the engine. The resulting diluted oil is circulated through the engine to clean the various bearing surfaces, and the warm-up hopper is filled with this diluted oil for a subsequent starting of the engine. However, upon operation of the scavenging pump after the engine has stopped, if the scavenging pump returns the oil to the main tank 24, the undiluted oil will be circulated through the engine and into the warm-up hopper thereby nullifying the effect of the previous operation of the dilution and diversion valves 40 and 30 respectively.

To overcome this difficulty, a solenoid 100 is provided for simultaneously operating the valves 30 and 40. The movable core 102 of the solenoid is biased by a spring 104 to hold the valves 30 and 31 in their normal position, illustrated in Figs. 2 and 3. As previously described, 10 to 12 minutes after the engine has started, the timing relay 94 is operative to reverse the position of its switches from that illustrated in the drawing. Accordingly, timing relay switch 92 is then closed. A manually operable push button switch 106 is connected in series with switch 92 and the solenoid 100 so that after the engine has been running for more than 10 to 12 minutes, the manual switch 106 may be closed prior to stoppage of the engine to operate the diversion and dilution valves 30 and 40 respectively. As previously described, the diversion valve is thus operated to return the scavenged oil directly to the warm-up hopper 32 and the dilution valve is opened to permit gasoline to mix with and dilute this oil. In addition, for automatic operation after the engine has stopped, the solenoid 100 is connected to control relay switch 84 in parallel with the manual switch 106.

The operation of the control system, after the engine has stopped, is then as follows: Pressure switch 76 closes to complete a circuit to the control relay 74. Control relay 74 operates to make a holding circuit for itself through contacts 88, 78, and 86 and also to complete a circuit to the motor relay 64 through contacts 88 and 78 to thereby start the after-running operation. Simultaneously, operation of the control relay 74 completes a circuit to the solenoid 100 through switches 92 and 84 to operate and hold the diversion valve 30 in the position in which scavenged oil is returned to the warm-up hopper as long as the scavenging pump is being operated. In addition, the above energization of control relay 74 completes a circuit to the heater element 98 of the timing relay through contacts 88 and 80. After the heater element 98 has been energized for a predetermined length of time, the timing relay operates to return its switches to their condition as illustrated on the drawing. This operation of the timing relay opens the circuit of the motor relay 64 and solenoid 100 to stop the after-running operation of the pumps 16 and 18 and return the diversion valve to its normal position. Thus, during the after-running operation, only the diluted oil is circulated through the engine and warm-up hopper. This diluted oil is then available for pre-oiling the engine when the engine is again to be started.

After the engine has stopped, there no longer is any fuel pressure in line 44 so that the operation of the dilution valve 40 by the solenoid 100 does not result in any further dilution of the oil. However, in order to prevent oil from passing into the fuel system at this time through the open dilution valve, a check valve 46 is placed in the fuel line.

Summarizing, before starting the engine the operator may lubricate the engine bearing surfaces by closing manual switch 72, master switch 70 being closed. As long as switch 72 is closed the electric motor 58 drives the pumps 16 and 18 to circulate oil through the engine. After the engine has been prelubricated, or during the prelubrication operation, the engine may be started. As soon as the engine is operating, the pressure responsive switch 76 opens in response thereto and if the engine runs for longer than 10 to 12 minutes the relay 94 operates, thereby preparing circuits which subsequently are completed by closure of manual switch 106 for operating the diversion and dilution valves 30 and 40, respectively, prior to stoppage of the engine, and for operating the engine oil pumps after the engine has stopped. Then, prior to stoppage of the engine, manual switch 106 is closed, whereupon the diversion valve 30 is operated to return the scavenged oil directly to the warm-up hopper 32 and the dilution valve 40 opens to admit fuel into the oil to dilute the oil. Switch 106 is held closed until the engine stops. After the engine stops pressure responsive switch 76 closes, whereupon the electric motor 58 is energized and operates the oil pumps 16 and 18 for a length of time predetermined by the characteristics of the heater element 98 and its associated heat responsive element 98'. Since the scavenge pump 18 has a larger capacity than the oil pressure pump 14, this operation of the engine oil pumps after the engine has stopped is effective to remove excess oil from the engine to the oil reservoir. Simultaneously with the energization of the electric motor 58 for operating the oil pumps 16 and 18 after the engine is stopped, a switch 84 automatically closes in parallel with manual switch 106 to insure operation of the diversion valve 30 for returning the scavenged oil directly to the warm-up hopper during this operation of the oil pumps. Thus, after the engine is stopped the diversion valve 30 is held in the position to return the lubricant to the warm-up hopper and pump motor 58 is operated for a predetermined time interval controlled by heater 98 and bi-metallic member 98'. At the end of this interval bi-metallic member 98' returns the switches 86, 88, 90 and 92 to the position of Figure 3 thereby simultaneously de-energizing solenoid 100 and motor 58. Then upon opening the master switch 70 the various parts are again disposed as shown in Figure 3.

With this system, upon operation of manual switch 106, prior to stoppage of the engine, the scavenged oil is diluted and is returned directly to the warm-up hopper 32, and therefore, during this operation prior to engine stoppage the oil pressure pump 16 will draw practically all of its oil from the warm-up hopper 32. This operation results in the warm-up hopper and the engine lubrication system becoming filled with diluted oil. After the engine stops, continued operation of the oil pumps and continued diversion of the scavenged oil to the warm-up hopper results in circulation of this diluted oil for a predetermined length of time. Also, in view of the larger capacity of the scavenge pump 18 as compared to the oil pressure pump 16, and since after the engine has stopped, oil is no longer being whirled around inside the engine, this operation of the engine oil pump after the engine has stopped is effective to remove surplus oil from the engine. This surplus oil is returned directly to the warm-up hopper and, in view of its previous dilution just prior to stoppage of the engine, diluted oil is available in the warm-up hopper for subsequent pre-oiling of the engine before the engine is started. It should be noted that during the operation of the engine oil pumps after the engine has stopped, the dilution valve 40 is open, but because of the absence of fuel pressure during this period this has no effect.

This automatic operation of the diversion valve after the engine has stopped makes it unnecessary to rely on the pilot or other operator for manually operating or manually initiating operation of the diversion valve after the engine has stopped for a length of time at least as long as the automatic operation of the scavenging pump.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination with an engine, an oil supply tank, a warm-up hopper, a pump normally driven from said engine for returning engine lubricating oil to said tank, means automatically operative after the engine is stopped for effecting operation of said pump for a predetermined length of time thereafter, and means automatically operative during said predetermined length of time for effecting diversion of the lubricating oil returned by said pump to said warm-up hopper.

2. In combination with an engine, an oil supply tank, a warm-up hopper within said tank, a pump for returning the engine lubricating oil to said tank, said pump normally being driven by said engine, a flow diversion valve operable to divert the oil returned by said pump directly into said warm-up hopper, means automatically operative after the engine is stopped for effecting operation of said pump, timing mechanism automatically operative at a predetermined length of time after the engine is stopped for terminating said pump operation, and means automatically operative during said predetermined length of time for effecting operation of said diversion valve.

3. In combination with an engine, a lubrication system therefor comprising an oil supply tank, a warm-up hopper, a first oil pressure pump for feeding lubricating oil from said tank and hopper to said engine, a second pump operable to return oil to said tank from said engine, said pumps normally being driven by said engine, means automatically operative after the engine is stopped for effecting operation of said pumps for a predetermined length of time thereafter, means automatically operative during said predetermined period for effecting diversion of the oil returned by said second pump to said warm-up hopper, and means operable to effect operation of said pumps prior to starting said engine.

4. In combination with an engine, a lubrication system therefor comprising an oil supply tank, an oil pump operable to return oil from said engine to said tank, said pump normally being driven from said engine, diversion means and dilution means operable to divert the return flow path of the oil and to dilute this oil in order to provide a relatively small supply of diluted oil for a subsequent engine starting operation, means automatically operative after the engine is stopped for effecting operation of said pump for a predetermined length of time thereafter, and means automatically operative during said length of time for effecting operation of said diversion means.

5. In combination with an engine, an oil supply tank, a warm-up hopper within said tank, a pump for returning the engine lubricating oil to said tank, said pump normally being driven by said engine, a flow diversion valve operable to divert the oil returned by said pump directly into said warm-up hopper, a dilution valve operable to dilute the oil returned by said pump into said hopper, means operable during engine operation to effect operation of said diversion and dilution valves, means automatically operative after the engine is stopped for effecting operation of said pump, timing mechanism automatically operative at a length of time after the engine is stopped for terminating said pump operation, and means automatically operative during said length of time for effecting operation of said diversion valve.

6. In combination with an engine, an oil supply tank, a warm-up hopper, a pump normally driven from said engine for returning engine lubricating oil to said tank, means automatically operative after the engine is stopped for effecting operation of said pump, timing mechanism automatically activated when said engine is stopped, means operated by said timing mechanism at a predetermined length of time after the engine is stopped for terminating said pump operation, and means automatically operative during said predetermined length of time for effecting diversion of the lubricating oil returned by said pump to said warm-up hopper.

EDWARD C. STEINER.